A. I. McGLOUGHLIN.
PIVOTAL TURNING MEANS FOR AUTOMOBILES.
APPLICATION FILED JAN. 25, 1913.
1,126,052.
Patented Jan. 26, 1915.
4 SHEETS—SHEET 4.
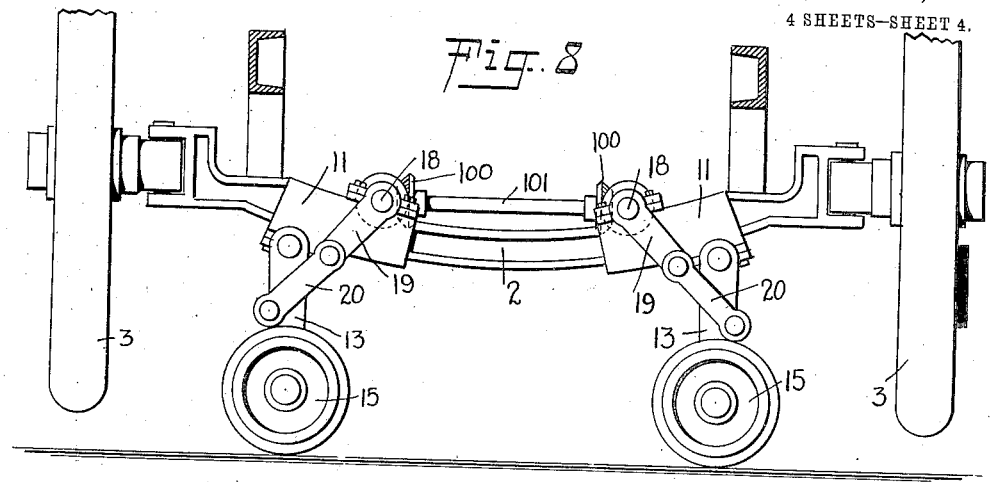
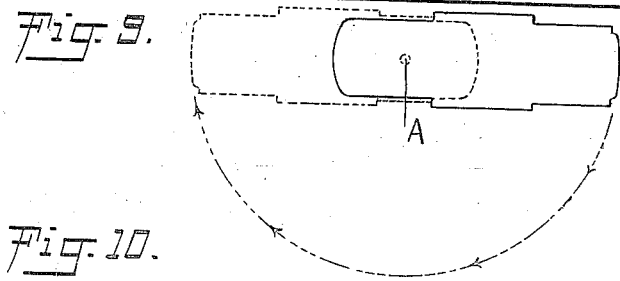
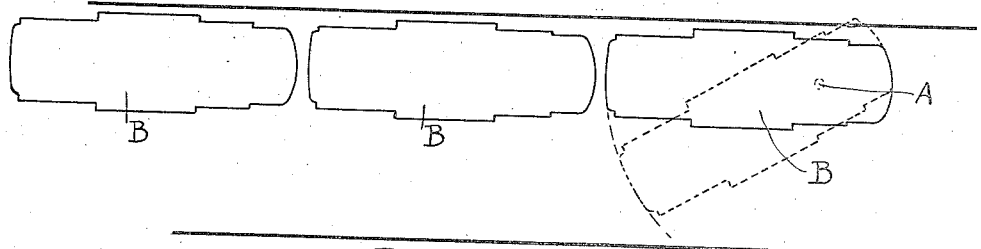
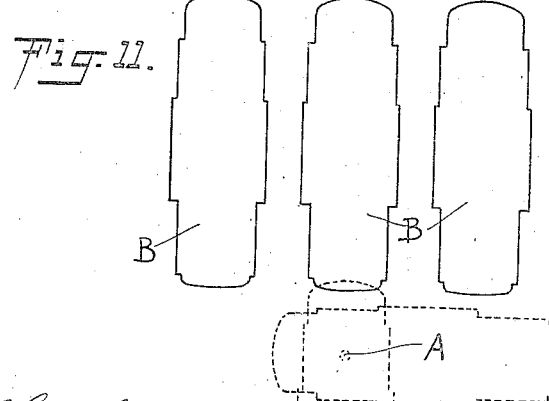
WITNESSES
William P. Goebel
INVENTOR
Alfred I. McGloughlin
BY
ATTORNEYS

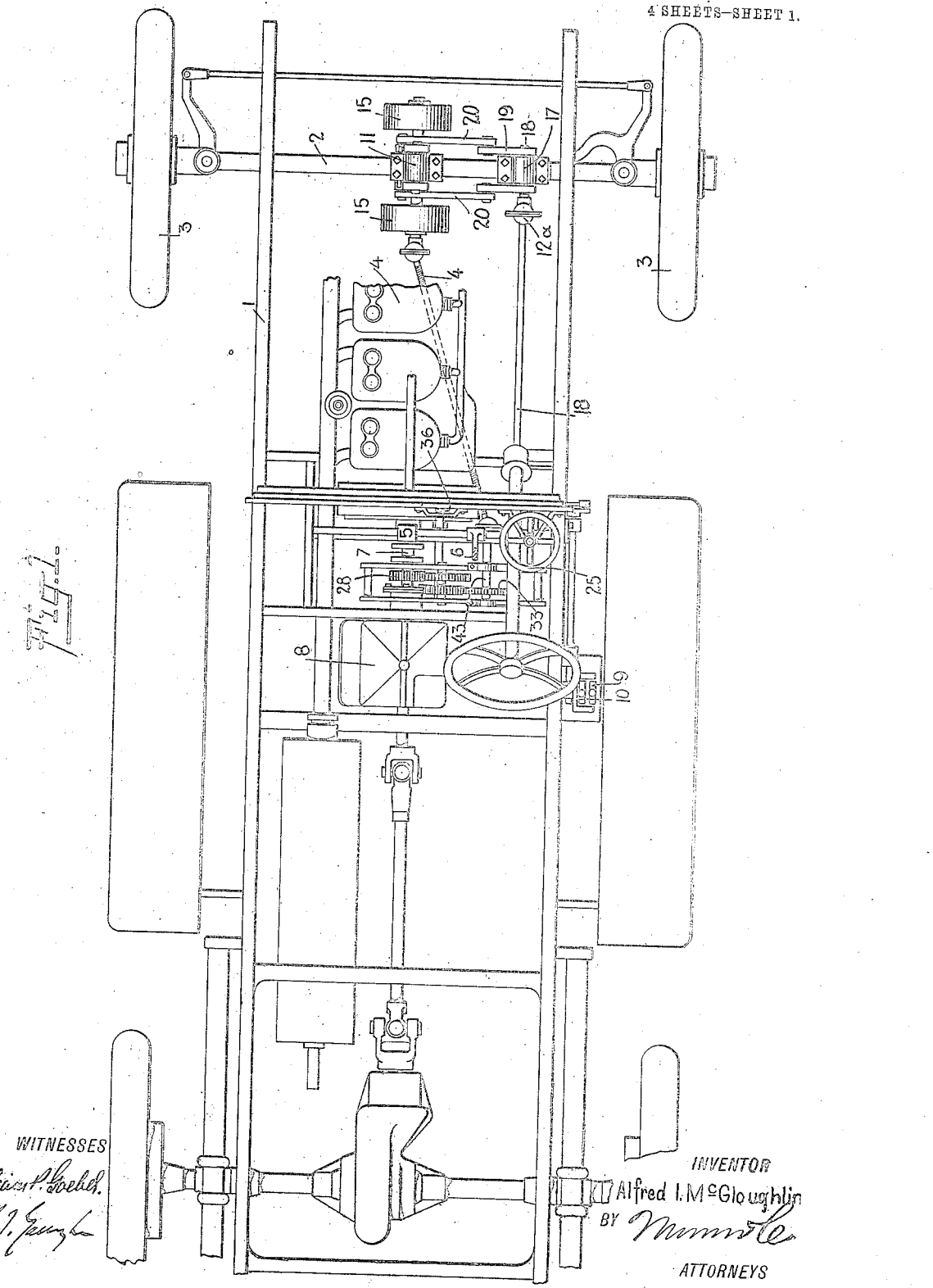

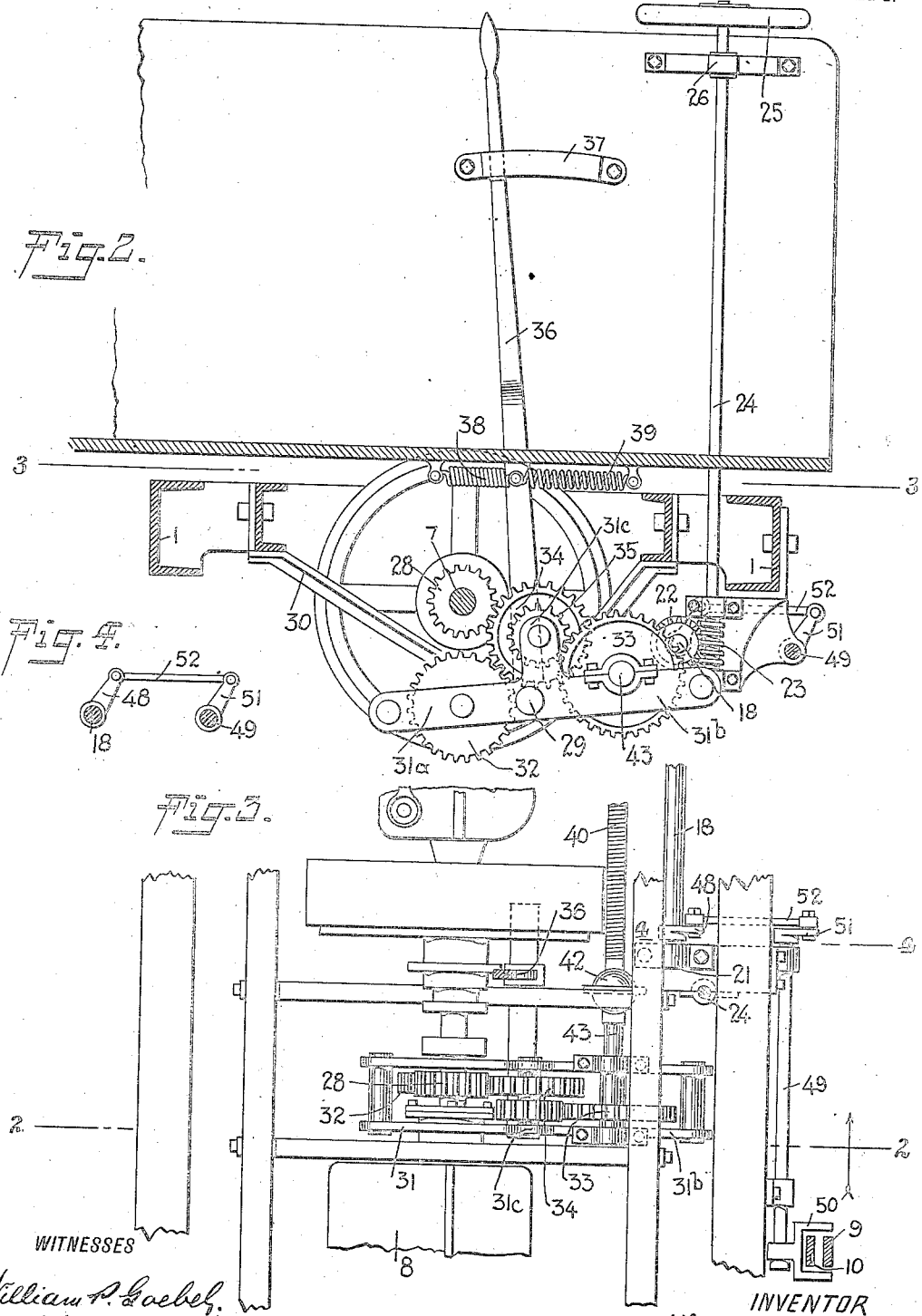

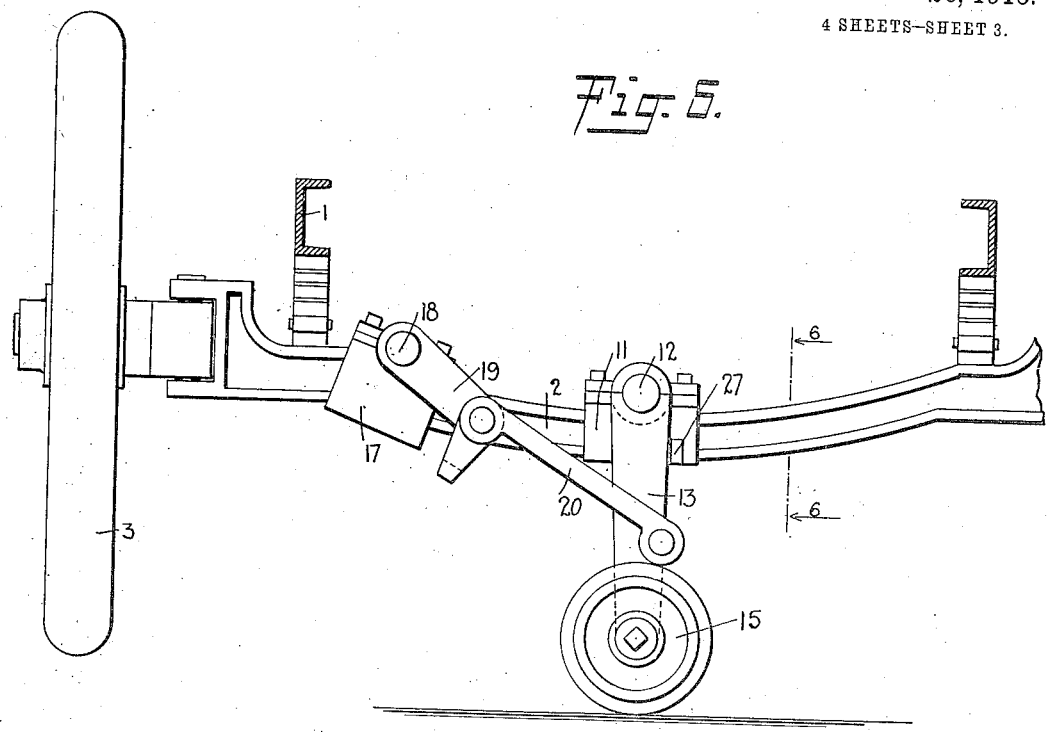
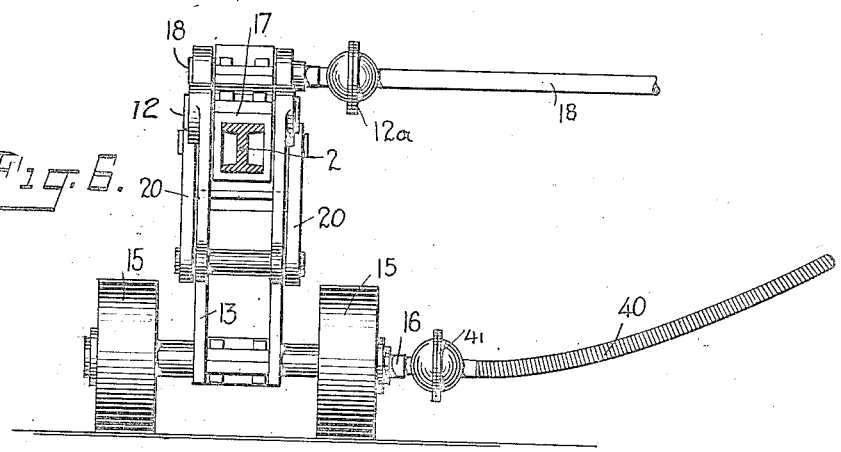
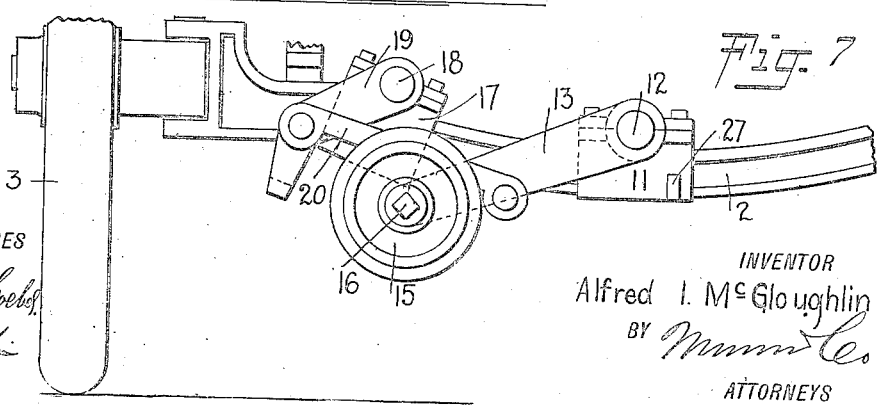

UNITED STATES PATENT OFFICE.

ALFRED I. McGLOUGHLIN, OF NEW YORK, N. Y.

PIVOTAL TURNING MEANS FOR AUTOMOBILES.

1,126,052.  Specification of Letters Patent.  Patented Jan. 26, 1915.

Application filed January 25, 1913. Serial No. 744,147.

*To all whom it may concern:*

Be it known that I, ALFRED I. McGLOUGHLIN, a subject of the King of Great Britain, and a resident of the city of New York, borough of Manhattan, in the county and State of New York, have invented a new and Improved Pivotal Turning Means for Automobiles, of which the following is a full, clear, and exact description.

This invention relates generally to a pivotal turning means for automobiles and the like, characterized by a structure permitting the vehicle to turn about a point which is substantially at the middle point of the rear axle.

The principal object of the invention is to provide a pivotal turning means for automobiles in the nature of a fifth wheel, adapted to be brought into engagement with the ground, whereby the vehicle may be turned in a space substantially as wide as the length of the vehicle.

A further object of the invention is to provide a pivotal turning means for automobiles and the like, which may be termed a fifth wheel, with means for bringing the wheel into engagement with the ground between the front wheels, the said means carrying the front wheels of the vehicle away from the ground.

A further object of the invention is the provision of a pivotal turning means for automobiles and the like, in the nature of a fifth wheel, adapted to support the forward end of the vehicle, suitable means being provided for the application of power from the vehicle motor to the said wheel, other means being provided for preventing movement of the speed change levers from a neutral position when the said wheel is in engagement with the ground.

Other objects and advantages following the use of the invention herein disclosed will appear as the description of the structure and manner of operation proceeds.

Reference is to be had to the accompanying drawings forming a part of this specification, in which like characters of reference indicate corresponding parts in all the views, and in which—

Figure 1 is a partial plan view of the chassis of an automobile equipped with the preferred form of my invention; Fig. 2 is a sectional view on the line 2—2 of Fig. 3; Fig. 3 is a partial and enlarged plan view showing the mechanism whereby power is transmitted from the driving shaft to the fifth wheel; Fig. 4 is a sectional view on the line 4—4 of Fig. 3; Fig. 5 is a front end view of the vehicle, showing the fifth wheel in operative relation to the ground; Fig. 6 is a sectional view on the line 6—6 of Fig. 5; Fig. 7 is a view similar to Fig. 5, showing the fifth wheel in inoperative position; Fig. 8 is a front end view of an automobile, showing a modified construction of the invention; while Figs. 9, 10 and 11 are diagrammatic views, showing the manner of turning a vehicle equipped with the invention herein described and claimed.

The vehicle which is illustrated is merely typical of the class of such structures to which the invention may be applied, and serves to show one adaptation of the preferred form of the invention, it being clear that various changes in the size, shape and relation of the parts constituting the embodiment of the inventive idea may be availed of in order to adapt such idea to different vehicles.

Referring to Fig. 1, the chassis of the vehicle may be designated 1, the forward axle 2, the front wheels 3, the engine 4, the clutch 5, the foot pedal operating the clutch 6, the drive shaft 7, the transmission with its gearing 8, and the brake and speed change levers as 9 and 10, respectively.

Fixed to the front axle 2, and at a substantially central point, is a bearing 11 supporting a shaft 12, at the forward end of which is an arm 13 carrying the fifth wheel 15 at its lower end, the said wheel being mounted on a shaft 16; it is, of course, clear that one wheel 15, or a plurality of them (as shown in Fig. 6) may be availed of, if so desired. Also secured to the said front axle, and to one side thereof, is a bearing 17 supporting a shaft 18 having an arm 19 secured thereto at its forward end; extending between the arms 13 and 19, and in pivotal relation with each, is a link 20. The structure as described comprises what may be termed a cradle for carrying the fifth wheel 15, with means for swinging it from the position shown in Fig. 7, or vice versa. It is clear that the form of this cradle may be varied, inasmuch as a plurality of arms 13 and a plurality of links 20, as well as a plurality of other arms 19 may be employed if so desired; such changes being merely those necessary to insure good construction and not involving a departure from the idea embodied.

The drawings set forth means for bringing the fifth wheel from the position shown in Fig. 7 to that shown in Fig. 5, and vice versa, and also set forth means whereby power may be applied directly to the said wheel 15, such structures being now set forth.

The before-mentioned shaft 18 extends rearwardly of the chassis to a point conveniently reached by the chauffeur, said shaft comprising preferably a flexible joint 12<sup>a</sup> (Fig. 1), the rear end of the shaft being supported in a bearing 21. Fixed on the said shaft is a pinion 22, and meshing therewith is a worm 23 at the lower end of an upwardly extending shaft 24, having a hand-wheel 25 at its upper end, the said shaft 24 being located adjacent the driver's seat, and being shown as supported in a bearing 26 carried by the dash. As the wheel 25 is turned power is transmitted through the worm 23 and pinion 22 to the shaft 18, and the arm 19 at the forward end thereof is raised or lowered, as the case may be, with the consequent movement of the arm 13 carrying the wheel 15 through the medium of the link 20; in order to assist the said arm 13 in being rigidly maintained in the position shown in Fig. 5, a shoulder 27 may be availed of, which is preferably placed on the said bearing 11 mounted on the front axle. Referring particularly to Fig. 5 it is to be noted that the length of the arm 13, together with the diameter of the fifth wheel 15, is such that when the said wheel is in lowermost position, resting on the ground, the front wheels 3 of the vehicle are raised from the ground, so that when power is applied to this fifth wheel 15 the vehicle may be turned about a vertical axis substantially at the center of the rear axle.

Referring particularly to Fig. 2, it will be noted that the main drive shaft 7 is provided with a pinion 28 fixed thereto; movably mounted on a pin 29 carried by the supporting structure 30, and extending between the opposite sides of the chassis 1, is a frame which is substantially T-shaped, and which comprises the ends 31<sup>a</sup>—31<sup>b</sup> and the central upwardly extending portion 31<sup>c</sup>; revolubly mounted adjacent the end 31<sup>a</sup> of this frame is a gear 32, and revolubly mounted adjacent the end 31<sup>b</sup> is a gear 33; revolubly mounted adjacent the middle upstanding part 31<sup>c</sup> of the frame is a gear 34, on the shaft of which is a pinion 35 which turns therewith, this said pinion engaging the gear 33, while the gear 34 engages the gear 32. This frame is adapted to swing about the pin 29 as a center, whereby either gear 32 or 34 may be brought into engagement with the pinion 28 on the main drive shaft 7, Fig. 2 showing the gear 34 in such engagement. Extending upwardly from this frame through the floor of the vehicle and adjacent the dash is a lever 36, the lower end of which is secured to the said frame, whereby movement of the lever will move the frame, bringing about the engagement of the gears, as described, the normal position of the lever being at a central point between the ends of the strap 37 which serve to maintain the lever in position, springs 38 and 39 extending toward opposite sides of the said lever serving to maintain it in such middle position. It is clear, of course, that movement of this lever to either end of the strap 37 will bring either gear 32 or 34 into engagement with the pinion 28, as described, the tension of the spring (as shown in Fig. 2 the spring 39) returning the lever to such middle position when force is removed therefrom. Thus power may be supplied to the gears from the main drive shaft, this power being brought to the fifth wheel 15 through the medium of a flexible shaft 40 (Fig. 6) which embodies a coupling 41 connected to the said shaft 16 on which the said wheel or wheels 15 are carried. This flexible shaft 40 (Fig. 3) extends rearwardly of the chassis, and is preferably provided with a second coupling 42 and engages a shaft 43 adapted to be driven by the before-mentioned gear wheel 33 which is carried in the T-shaped frame shown particularly in Fig. 2; as set forth particularly in Fig. 3 this gear wheel 33 is mounted directly on the shaft 43, although it is clear that other structures may be availed of if so desired. It is apparent, therefore, that this system of gearing may be set into operation to rotate the fifth wheel mechanism in either direction without first stopping the motor. In other words, when the machine is in motion, it may be stopped in the usual manner by shifting the main clutch, and then while the motor continues in motion, the lever 36 may be forced in either direction against the tension of the spring 38 or 39 so as to bring one or the other of the gears 32 and 34 into mesh with the pinion 28. The front end of the automobile, therefore, may be swung around as above set forth, and subsequently the lever 36 will be brought to normal position and the main driving mechanism may be reclutched for the propulsion of the vehicle in or from its new position, the motor continuing in operation all the time.

From the description set forth it will be apparent that manipulation of the hand wheel 25 (Fig. 2) will actuate the shaft 18, whereby the fifth wheel 15 is brought from the position shown in Fig. 7 to the position shown in Fig. 5 into engagement with the ground, the wheels 3 leaving the ground; the application of power then to the flexible shaft 40 through manipulation of the lever 36 (Fig. 2) will serve to turn the vehicle, the power being applied to the fifth wheel 15.

The before-mentioned gear 28 which is carried by the power shaft 7 (Fig. 2) is placed between the engine 4 and the transmission 8, and it is designed to bring about the results set forth when the transmission is inoperative; that is, when the speed change lever is in a neutral position. In order to bring about such position of the speed change lever the structure shown particularly in Figs. 3 and 4 may be availed of.

Fixed to the forwardly extending shaft 18, which serves to lower the wheel 15, is an arm 48; extending longitudinally of the machine is a shaft 49, the rear end of which is provided with a yoke 50, the yoke being in such position that it is adapted to embrace the brake and speed change levers 9—10 when they are in neutral position; the forward end of this shaft is provided with an arm 51, there being a link 52 extending between the said arm 51 and the first mentioned arm 48. When the handwheel 25 is turned in order to bring the fifth wheel 15 into engagement with the ground, turning of the shaft 18 will turn the shaft 49 because of the link connection 52, the yoke 50 moving downwardly, and if the said levers which control the brake and the transmission are in neutral position this yoke will embrace them, as shown particularly in Fig. 3, thereby preventing movement of the levers from such position. The yoke is so designed that if these said levers are not in neutral position then the yoke may engage them, complete movement of the shaft 18 being prevented until the levers are brought to a neutral position so that free and unobstructed movement of the yoke 50 is permitted.

The structure shown is, of course, capable of modification, and in Fig. 8 I have shown one departure especially adapted for use with heavy vehicles, such as trucks. In this case there are a plurality of forward wheels 15 located on each side of the center of the forward axle 2, there being a plurality of bearings 11, arms 19 and links 20. The axles or shafts 18 which carry the said arms 19 which bring about movement of the arms 13 are provided with beveled gears which mesh with the beveled gears 100 positioned adjacent opposite ends of the transversely extending shaft 101, so that when power is applied to lower the wheels 15 both wheels shown will be lowered simultaneously. The use of such a structure does not involve a departure from the invention, as the manner of bringing about the result desired is the same in this case as previously set forth.

In Figs. 9, 10 and 11 are diagrams setting forth the several instances wherein the fifth wheel is of advantage in every day use. In Fig. 9 the point A is representative of the middle point of the rear axle, and the broken line indicates the path which the forward end of the vehicle takes in turning from the full line to the broken line position; in this case the vehicle turns about this point A as a center, and the width of the space in which the vehicle may turn is substantially equal to the length of the machine. In Fig. 10 a number of vehicles B are illustrated, one after the other and close together, the broken lines indicating how the end vehicle may be conveniently brought out of the line without having those to either side of it moved, since the vehicle swings about the point A as a center. In Fig. 11 a number of vehicles are indicated, arranged closely together and side by side, the broken line position indicating the manner of turning the middle vehicle without the necessity of moving those at either side.

The construction described is also adapted for use in garages and storehouses where vehicles must be stored close together in order to save room, the use of the invention doing away with the necessity of a turntable.

It will, of course, be understood that the terms used in defining the different parts of the structure are merely for the purpose of making such a structure clear, and may be equally applied to any equivalent structure performing the same function.

Having thus described my invention, what I claim as new and desire to secure by Letters Patent is:—

1. In combination with the motor of an automobile, a T-shaped frame, a plurality of gears mounted on said frame and meshing with one another each to each in fixed positions, said frame being movably mounted in position, a motor gear, a lever connected to the frame, means acting on the lever to normally and automatically hold the same and the frame with its gears out of mesh with the motor gear, the said frame in one extreme position bringing one gear into operative relation with the motor gear, the frame in another extreme position bringing another gear into operative relation with the motor gear, and a shaft associated with the said frame, the said shaft being adapted to be turned in opposite directions when the said frame occupies one of the aforesaid extreme positions.

2. In combination with the engine of an automobile, a T-shaped frame provided with a number of gears operatively associated with each other, means whereby the frame may be moved in order to bring one of the said gears into operative relation with the engine, a shaft associated with the gears, means for bringing the gears into operative relation with the engine, and other means for preventing such movement of the gears save when the speed change lever is in neutral position.

3. In combination with the power shaft and change speed lever of an automobile, a T-shaped frame pivotally mounted in position and provided with a plurality of interengaging gears, a shaft associated with one of the gears, means whereby the frame may be moved in order to bring one of the said gears into operative relation with the said power shaft, whereby the said second shaft may be turned, the direction of rotation of the said second shaft depending on which one of the gears coöperates with the said power shaft, a fifth wheel connected to said second shaft, and means to bring the fifth wheel into contact with the ground and comprising a member adapted to embrace the speed change lever when it is in neutral position, whereby the said coöperative relation of the gears and power shaft is permitted.

4. In combination with the engine and running gear of an automobile, an auxiliary wheel movably mounted adjacent one end of the automobile and adapted to be brought into engagement with the ground in order to support that end of the automobile, means for bringing the said wheel into such engagement, means associated with the engine of the automobile for applying power to the said auxiliary wheel, means for bringing about coöperative relation between the said means and the engine, and a device actuated by movement of the means for lowering the said auxiliary wheel and coöperating with the speed change lever, whereby movement of the said means is prevented save when the said lever is in a neutral position.

5. In combination with the running gear of an automobile, an auxiliary wheel adjacent one end of the automobile and adapted to be brought into engagement with the ground in order to support that end of the automobile, means for bringing about the said engagement of the auxiliary wheel, and other means associated with the said means and speed change lever, whereby movement of the first means is prevented save when the said lever is in a neutral position.

6. In combination with the motor of an automobile, a T-shaped frame, a plurality of gears mounted on said frame and meshing with one another each to each in fixed positions, said frame being movably mounted in position, a motor gear, a lever connected to the frame, means acting on the lever to normally and automatically hold the same and the frame with its gears out of mesh with the motor gear, the said frame, in one extreme position, bringing one gear into operative relation with the motor gear, the frame in another extreme position bringing another gear into operative relation with the motor gear, and a shaft associated with the said frame, the said shaft being adapted to be turned in opposite directions when the said frame occupies the aforesaid extreme positions, whereby the motor may be kept running and the combination started, stopped, or reversed by the use of the main motor clutch in connection with the gear actuating lever.

In testimony whereof I have signed my name to this specification in the presence of two subscribing witnesses.

ALFRED I. McGLOUGHLIN.

Witnesses:
 CLINTON M. CRUIKSHANK,
 LAURENCE J. GALLAGHER.